United States Patent
Zischka et al.

(10) Patent No.: US 11,203,698 B2
(45) Date of Patent: *Dec. 21, 2021

(54) PACKAGING MATERIAL WITH AT LEAST ONE BARRIER LAYER FOR HYDROPHOBIC COMPOUNDS

(71) Applicant: Mayr-Melnhof Karton AG, Vienna (AT)

(72) Inventors: Michael Zischka, Stattegg-Muhl (AT); Julia Spanring, Graz (AT); Martin Reischl, Stallhofen (AT)

(73) Assignee: Mayr-Melnhof Karton AG, Vienna (AT)

(*) Notice: Subject to any disclaimer, the term of this patent is extended or adjusted under 35 U.S.C. 154(b) by 117 days.

This patent is subject to a terminal disclaimer.

(21) Appl. No.: 16/124,445

(22) Filed: Sep. 7, 2018

(65) Prior Publication Data

US 2019/0002725 A1 Jan. 3, 2019

Related U.S. Application Data

(62) Division of application No. 14/649,316, filed as application No. PCT/EP2013/075821 on Dec. 6, 2013, now Pat. No. 10,100,215.

(30) Foreign Application Priority Data

Dec. 6, 2012 (EP) .................................. 12195926

(51) Int. Cl.
*C09D 129/04* (2006.01)
*B65D 65/42* (2006.01)
(Continued)

(52) U.S. Cl.
CPC ............ *C09D 129/04* (2013.01); *B05D 1/02* (2013.01); *B05D 1/26* (2013.01); *B65D 65/42* (2013.01);
(Continued)

(58) Field of Classification Search
CPC .................................................... C09D 129/04
See application file for complete search history.

(56) References Cited

U.S. PATENT DOCUMENTS 3,277,041 A 10/1966 Sieg et al.
3,501,424 A * 3/1970 Ikari ...................... D21H 19/46
524/45
(Continued)

FOREIGN PATENT DOCUMENTS

AT 395617 B 2/1993
AU 7818481 A 6/1982
(Continued)

OTHER PUBLICATIONS

Craemer—DE 866596 C—IDS—MT—packaging with PVOH layer—1953 (Year: 1953).*
(Continued)

*Primary Examiner* — Callie E Shosho
*Assistant Examiner* — John Vincent Lawler
(74) *Attorney, Agent, or Firm* — Barlow, Josephs & Holmes, Ltd.; David R. Josephs

(57) ABSTRACT

The invention relates to a coated packaging material that has a substrate having a base material of cellulose, an outer side to be faced away from the packaging item as well as an inner side to be faced towards the packaging item. The inner side of the substrate carries at least one layer of an aqueous composition, which includes at least polyvinyl alcohol and/or at least one polyvinyl alcohol copolymer as well as a cross-linking agent, wherein the aqueous composition has at most 40% by wt. of polyvinyl alcohol and/or polyvinyl alcohol copolymer and a total solid content of at most 55% by wt. The layer and cross-linking the polyvinyl alcohol and/or the polyvinyl alcohol copolymer is dried with the aid
(Continued)

Figure 1:
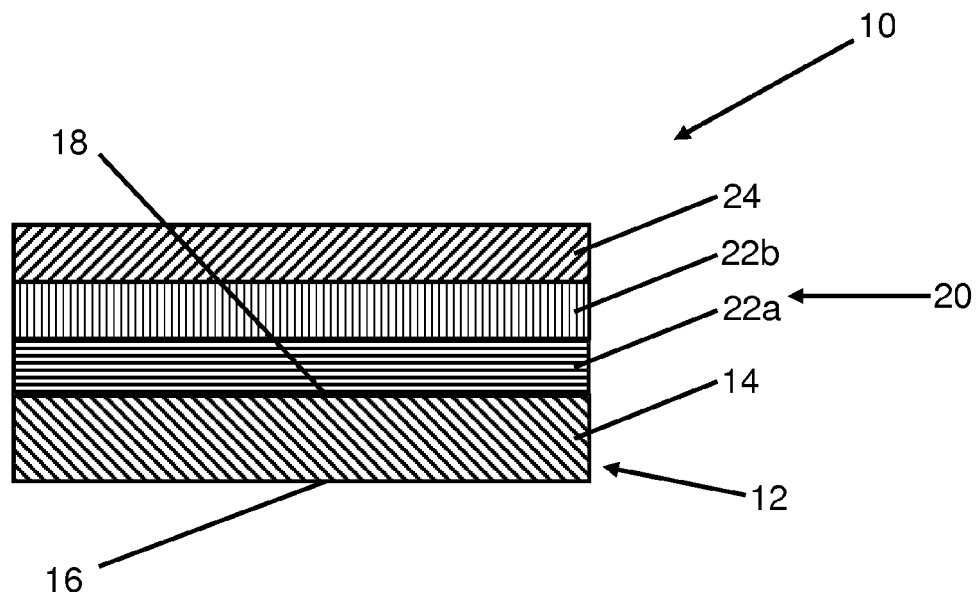

of the cross-linking agent with formation of a barrier layer for hydrophobic compounds are performed.

11 Claims, 1 Drawing Sheet

(51) Int. Cl.
| | | |
|---|---|---|
| *B05D 1/02* | (2006.01) | |
| *B05D 1/26* | (2006.01) | |
| *C08K 3/10* | (2018.01) | |
| *C08K 5/07* | (2006.01) | |
| *C08K 5/09* | (2006.01) | |
| *C08K 5/092* | (2006.01) | |
| *C08K 5/101* | (2006.01) | |
| *C08K 5/1539* | (2006.01) | |
| *C08K 5/5415* | (2006.01) | |
| *D21H 19/58* | (2006.01) | |
| *D21H 19/66* | (2006.01) | |
| *D21H 19/82* | (2006.01) | |

(52) U.S. Cl.
CPC ................ *C08K 3/10* (2013.01); *C08K 5/07* (2013.01); *C08K 5/09* (2013.01); *C08K 5/092* (2013.01); *C08K 5/101* (2013.01); *C08K 5/1539* (2013.01); *C08K 5/5415* (2013.01); *D21H 19/58* (2013.01); *D21H 19/66* (2013.01); *D21H 19/822* (2013.01); *Y02P 20/582* (2015.11)

(56) References Cited

U.S. PATENT DOCUMENTS

| | | | | |
|---|---|---|---|---|
| 5,358,790 | A * | 10/1994 | Ruf ................ | D21H 19/18 428/486 |
| 5,989,724 | A * | 11/1999 | Wittosch ................ | B65D 65/42 428/511 |
| 6,071,576 | A * | 6/2000 | Bentmar ................ | B32B 27/10 428/34.2 |
| 6,852,422 | B2 | 2/2005 | Kendall et al. | |
| 6,872,459 | B1 | 3/2005 | Frisk et al. | |
| 7,473,439 | B2 | 1/2009 | Rogers Agent et al. | |
| 2003/0113514 | A1 * | 6/2003 | Saito ................ | C09D 129/04 428/195.1 |
| 2003/0188839 | A1 * | 10/2003 | Urscheler ................ | D21H 19/82 162/123 |
| 2007/0036999 | A1 | 2/2007 | Agent et al. | |
| 2012/0088108 | A1 | 4/2012 | Paolilli et al. | |

FOREIGN PATENT DOCUMENTS

| | | | |
|---|---|---|---|
| DE | 866596 | 4/1952 | |
| DE | 866596 C * | 2/1953 | ............ C08L 61/24 |
| DE | 1107590 B | 5/1961 | |
| DE | 1232012 B | 1/1967 | |
| DE | 1696222 A1 | 12/1971 | |
| DE | 69317116 T2 | 9/1998 | |
| DE | 69603450 T2 | 3/2000 | |
| DE | 69630892 T2 | 4/2004 | |
| DE | 69531658 T2 | 6/2004 | |
| DE | 69532378 T2 | 7/2004 | |
| DE | 60022779 T2 | 5/2006 | |
| DE | 112007002272 T5 | 8/2009 | |
| EP | 0651093 A1 | 5/1995 | |
| EP | 0718437 A1 | 6/1996 | |
| EP | 1661925 A1 | 5/2006 | |
| EP | 1884594 A1 | 2/2008 | |
| EP | 1892089 A1 | 2/2008 | |
| EP | 1894971 A1 | 3/2008 | |
| EP | 2532706 A1 | 12/2012 | |
| GB | 908866 | 10/1962 | |
| JP | 09012935 A | 1/1997 | |
| JP | H11513640 | 11/1999 | |
| WO | 9311938 A1 | 6/1993 | |
| WO | 9601736 A1 | 1/1996 | |
| WO | 9603537 A1 | 2/1996 | |
| WO | 9605054 A1 | 2/1996 | |
| WO | 9627624 A1 | 9/1996 | |
| WO | WO2001/17774 A1 * | 3/2001 | ............ C08L 61/24 |
| WO | 0188269 A1 | 11/2001 | |
| WO | 2012168433 A1 | 12/2012 | |

OTHER PUBLICATIONS

Li—Control of moisture content in paper—Trans.Inst.Meas.Contrl.—2003 (Year: 2003).*
Han—Maleic acid crosslinking PVOH membranes—Trans.I.Chem.Eng.—2003 (Year: 2003).*
Maleic acid _ C4H4O4—PubChem (Year: 2020).*

* cited by examiner

PACKAGING MATERIAL WITH AT LEAST ONE BARRIER LAYER FOR HYDROPHOBIC COMPOUNDS

CROSS-REFERENCE TO RELATED APPLICATIONS

This application is a divisional of U.S. application Ser. No. 14/649,316, filed Jun. 3, 2015, which claims the benefit of and is a Section 371 national stage application of PCT International Patent Application No. PCT/EP2013/075821, filed Dec. 6, 2013, which claims priority from European Patent Application No. 12 195 926.6, filed on Dec. 6, 2012, the entire contents of the foregoing are hereby incorporated herein by reference.

BACKGROUND OF THE INVENTION

The invention relates to a method for producing a coated packaging material as well as to a packaging material with at least one barrier layer for hydrophobic compounds.

From the prior art, various packaging materials with barrier layers against hydrophobic compounds are known. For example, DE 695 32 378 T2 discloses a cellulose fiber fabric, which has a layer as the barrier layer, which has a continuous arrangement of randomly oriented cellulose fibers as well as a layer including cyclodextrin, wherein the layer including cyclodextrin in turn functions as a barrier layer or trap for preventing the passage of permeating hydrophobic compounds—such as for example mineral oils, aromatic hydrocarbons, printing colors and the like.

The circumstance is to be considered disadvantageous in the known packaging material that it is comparatively costly and expensive in the production.

BRIEF SUMMARY OF THE INVENTION

It is the object of the invention to provide a simpler and more inexpensively practicable method for producing a packaging material based on pulp with a barrier layer for hydrophobic compounds. A further object of the invention is to provide a simpler and more inexpensively producible packaging material based on pulp with a barrier layer for hydrophobic compounds.

According to the invention, the objects are solved by a coated packaging material as well as by a packaging material. Advantageous embodiments with convenient developments of the invention are specified in detail below.

A method according to the invention for producing a coated packaging material includes at least the steps of a) providing a substrate having a base material of pulp, an outer side to be faced away from a packaging item as well as an inner side to be faced towards the packaging item, b) coating at least the inner side of the substrate with at least one layer of an aqueous composition including at least polyvinyl alcohol and/or at least one polyvinyl alcohol copolymer as well as a cross-linking agent, wherein the aqueous composition has at most 40% by wt. of polyvinyl alcohol (PVOH) and/or polyvinyl alcohol copolymer and a total solid content of at most 55% by wt., and c) drying the layer and cross-linking the polyvinyl alcohol and/or the polyvinyl alcohol copolymer with the aid of the cross-linking agent with formation of a barrier layer for hydrophobic compounds. Therein, within the scope of the present invention, a material is understood by a base material of pulp (cellulose), which is at least predominantly, that is at least 51%, in particular at least 75% and preferably at least 90%, composed of cellulose, wherein within the scope of the present invention percentage specifications generally are to be understood as percent by weight unless anything to the contrary is indicated. The base material can generally be uncoated or already be provided with one or more layers, wherein at least on the inner side uncoated base material or base material only provided with a coat and/or a sizing is preferred. For example, the base material can be coated or uncoated paper, coated or uncoated cardboard or coated or uncoated paperboard. Furthermore, the substrate or the base material can generally be formed in single-ply, two-ply, three-ply, four-ply manner and so on. For example, the substrate can be a so-called tissue paper, that is an absorbent, finely creped paper of pulp, which mostly is formed in multi-ply manner of multiple layers of the cellulose containing base material and can be used as toilet paper, kitchen wiper, paper napkin, paper handkerchief and the like. Similarly, it can be provided that the base material or the substrate is formed as a so-called liner, sack paper or the like. Similarly, the base material can be composed of a cellulose containing raw material such as for instance a semi-chemical pulp, mechanical pulp or the like or proportionally include such a raw material. The configuration of the outer side of the base material is irrelevant to the present invention such that the outer side can be formed independently of the inner side of the base material and can for example be untreated or uncoated or coated, smoothed, overcoated, imprinted, embossed, satinized or otherwise treated. Within the scope of the invention, a thermoplastic plastic is understood by polyvinyl alcohol, which is at least predominantly composed of head-head- and/or head-tail-linked monomers of the general formula

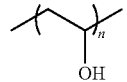

Within the scope of the present invention, copolymers are to be understood by polyvinyl alcohol copolymers, which are at least 20 mol % composed of monomers of the general formula

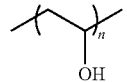

and include at least one further monomer type, for example an acrylate or methacrylate, except for possibly present non-hydrolyzed vinylacetate monomers. Preferably, the used polyvinyl alcohol copolymers are at least comparably water-soluble as polyvinyl alcohol. Polyvinyl alcohols usable within the scope of the invention are for example accessible by the hydrolysis of polyvinyl esters, in particular of polyvinyl acetate, known per se. Usual trade names of polyvinyl alcohols and polyvinyl alcohol copolymers suitable for performing the invention for thermoplastic applications are for example Elvanol, Gohsenol, Polyviol, Poval, Mowiol, Selvol, Exceval or Mowiflex. Furthermore, different polyvinyl alcohols and/or polyvinyl alcohol copolymers can also be used in the aqueous composition as long as the sum of all of the polyvinyl alcohols and polyvinyl alcohol copolymers does not exceed the maximum proportion of 40% by wt. Generally, within the scope of the present invention, all of the indications to polyvinyl alcohol(s)

correspondingly also apply to polyvinyl alcohol copolymers unless anything to the contrary is indicated. Within the scope of the present invention, by the total solid content, the content of the aqueous composition in terms of solids is understood, wherein polyvinyl alcohols and/or polyvinyl alcohol copolymers also contribute to the total solid content. In other words, the total solid content specifies the weight portion after removing the water from the aqueous composition. For determining the total solid content, the aqueous composition can for example be evaporated to dryness by vaporizing or by heating under normal pressure or in vacuum. Within the scope of the invention, by a cross-linking agent, compounds are understood, which contribute to the formation of a three-dimensional network by reaction with polyvinyl alcohol or polyvinyl alcohol copolymers. Generally, a single chemical compound or a mixture of different chemical compounds can be used as the cross-linking agent. Suitable cross-linking agents in particular include bi-, tri- or multi-functional compounds, which are able to react with hydroxy groups of the polyvinyl alcohol. The aqueous composition, which can also be referred to as coat or coating color, can generally be formed free of fillers and/or pigments or alternatively include fillers and/or pigments. However, it is to be emphasized that the total solid content of the aqueous composition including possibly present fillers/pigments is always at most 55% by wt., since the aqueous composition can hereby be used as a low-viscosity coating color, which allows particularly high application speeds with at the same time low production cost. For example, the aqueous composition can have a total solid content of 1% by wt., 2% by wt., 3% by wt., 4% by wt., 5% by wt., 6% by wt., 7% by wt., 8% by wt., 9% by wt., 10% by wt., 11% by wt., 12% by wt., 13% by wt., 14% by wt., 15% by wt., 16% by wt., 17% by wt., 18% by wt., 19% by wt., 20% by wt., 21% by wt., 22% by wt., 23% by wt., 24% by wt., 25% by wt., 26% by wt., 27% by wt., 28% by wt., 29% by wt., 30% by wt., 31% by wt., 32% by wt., 33% by wt., 34% by wt., 35% by wt., 36% by wt., 37% by wt., 38% by wt., 39% by wt., 40% by wt., 41% by wt., 42% by wt., 43% by wt., 44% by wt., 45% by wt., 46% by wt., 47% by wt., 48% by wt., 49% by wt., 50% by wt., 51% by wt., 52% by wt., 53% by wt., 54% by wt. or 55% by wt., wherein the total content of polyvinyl alcohol and polyvinyl alcohol copolymers is at most 40% by wt. In other words, the total solid content of the aqueous composition is limited to about 40% by wt. depending on the respectively used cross-linking agent, if the aqueous composition includes exclusively polyvinyl alcohol or one or more polyvinyl alcohol copolymers besides the cross-linking agent. Hereby, the layer functioning as a barrier layer against hydrophobic compounds can be particularly fast and flexibly produced since important parameters such as viscosity of the aqueous composition, wet and dry layer thickness of the layer, drying time, cross-linking level and cross-linking speed can be optimally adapted to the respective purpose of employment. Generally, higher total solid contents result in correspondingly lower water portions and thereby in shorter drying times such that coating plants with correspondingly shorter drying paths can advantageously be used. Conversely, with higher total solid contents, the viscosity of the aqueous composition increases such that compositions with more than 55% by wt. of total solid content can no longer be reasonably applied to the substrate or the pulp base material. For applying the aqueous composition, for example, contour coating methods known per se can be used, wherein the invention generally is not restricted with respect to the application methods to be used in step b). Moreover, the method according to the invention can be performed in particularly simple and low-cost manner since only inexpensive starting materials are required and can be fast and simply processed with the aid of usual application tools. The barrier layer thus produced of the packaging material is usable as an oil and fat barrier. By cross-linking the polyvinyl alcohol/polyvinyl alcohol copolymer, a partial hydrophobicity is also obtained, which is expressed via the COBB values.

By cross-linking the polyvinyl alcohol/polyvinyl alcohol copolymer, a barrier layer is generated on the inner side of the packaging material, which functions as a barrier and/or trap with respect to hydrophobic compounds and completely or at least approximately completely inhibits migration of these hydrophobic compounds from the outer side of the packaging material and/or from the base material into the interior of the packaging. Due to the transverse cross-linking of the polyvinyl alcohol, the barrier layer is humidity-resistant, whereby the barrier effect can be advantageously maintained over the entire lifetime of a packaging manufactured from the packaging material according to the invention. Moreover, the packaging material produced according to the invention is both aerobically and anaerobically degradable since both the cellulose base material and the coating have a hydrophilic surface, which are thereby accessible to the bacterial degradation. By forming the barrier layer on the inner side of the packaging material, the barrier layer is additionally particularly reliably protected from mechanical damage in transport or during storage of a packaging formed of the packaging material according to the invention. The packaging material produced via the method according to the invention additionally guarantees for example the food safety of the packaging item due to its barrier effect with respect to hydrophobic compounds—such as for instance mineral oil components of recycling material or mineral oil components of imprints. At the same time, it obtains the ecological advantages of a packaging economy based on waste paper and ensures the recyclability of the coated substrate.

In an advantageous configuration of the invention, it is provided that an aqueous composition is used, which has a content of polyvinyl alcohol and/or polyvinyl alcohol copolymer between 2% by wt. and 35% by wt, in particular between 10% by wt. and 32% by wt. and preferably between 26% by wt. and 30% by wt. In this manner, the substrate can be particularly fast, inexpensively and reliably provided with a barrier layer, which has particularly good barrier characteristics with respect to hydrophobic compounds. Alternatively or additionally, an aqueous composition is used, which has a total solid content between 2% by wt. and 52% by wt., in particular between 10% by wt. and 50% by wt. and preferably between 26% by wt. and 45% by wt., and/or a water content of at least 45% by wt., in particular of at least 55% by wt. and preferably with a water content between 65% by wt. and 70% by wt. Hereby too, the substrate can be particularly fast, inexpensively and reliably provided with a high-quality barrier layer. Therein, by a water content of at least 45% by wt., in particular water contents of 45% by wt., 46% by wt., 47% by wt., 48% by wt., 49% by wt., 50% by wt., 51% by wt., 52% by wt., 53% by wt., 54% by wt., 55% by wt., 56% by wt., 57% by wt., 58% by wt., 59% by wt., 60% by wt., 61% by wt., 62% by wt., 63% by wt., 64% by wt., 65% by wt., 66% by wt., 67% by wt., 68% by wt., 69% by wt., 70% by wt., 71% by wt., 72% by wt., 73% by wt., 74% by wt., 75% by wt., 76% by wt., 77% by wt., 78% by wt., 79% by wt., 80% by wt., 81% by wt., 82% by wt., 83% by wt., 84% by wt., 85% by wt., 86% by wt., 87% by wt., 88% by wt., 89% by wt., 90% by wt., 91% by wt., 92% by wt., 93% by wt., 94% by wt., 95% by wt., 96% by wt., 97% by wt., 98% by wt. or 99% by wt. are to be understood, wherein water contents between 65% by wt. and 70% by wt. have proven particularly advantageous for most of the applications.

In a further advantageous configuration of the invention, it is provided that a polyvinyl alcohol and/or a polyvinyl alcohol copolymer with a degree of hydrolysis between 75% and 100%, in particular between 80% and 99.9% is used or are used. By a degree of hydrolysis between 75% and 100%, within the scope of the invention, degrees of hydrolysis of 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% as well as corresponding intermediate values such as for example 99.0%, 99.1%, 99.2%, 99.3%, 99.4%, 99.5%, 99.6%, 99.7%, 99.8%, 99.9% or 100.0% are understood. Alternatively or additionally, it can be provided that a polyvinyl alcohol and/or a polyvinyl alcohol copolymer with a degree of polymerization between 100 and 3000, in particular between 120 and 1200 and preferably between 150 and 650, and/or with an average molecular weight between 11000 g/mol and 60000 g/mol, in particular between 13000 g/mol and 23000 g/mol and/or between 31000 g/mol and 50000 g/mol is or are used. By a degree of polymerization, the number of the monomer units in a polymer molecule is understood. By a degree of polymerization between 100 and 3000, for example, degrees of polymerization of 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950 or 3000 as well as corresponding intermediate values such as for example 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640 or 650 and 150, 151, 152, 153, 154, 155, 156, 157, 158, 159, 160 etc., respectively, are to be understood. The degree of polymerization generally is an average value. By an average molecular weight between 11000 g/mol and 60000 g/mol, for example, molecular weights of 11000 g/mol, 12000 g/mol, 13000 g/mol, 14000 g/mol, 15000 g/mol, 16000 g/mol, 17000 g/mol, 18000 g/mol, 19000 g/mol, 20000 g/mol, 21000 g/mol, 22000 g/mol, 23000 g/mol, 24000 g/mol, 25000 g/mol, 26000 g/mol, 27000 g/mol, 28000 g/mol, 29000 g/mol, 30000 g/mol, 31000 g/mol, 32000 g/mol, 33000 g/mol, 34000 g/mol, 35000 g/mol, 36000 g/mol, 37000 g/mol, 38000 g/mol, 39000 g/mol, 40000 g/mol, 41000 g/mol, 42000 g/mol, 43000 g/mol, 44000 g/mol, 45000 g/mol, 46000 g/mol, 47000 g/mol, 48000 g/mol, 49000 g/mol, 50000 g/mol, 51000 g/mol, 52000 g/mol, 53000 g/mol, 54000 g/mol, 55000 g/mol, 56000 g/mol, 57000 g/mol, 58000 g/mol, 59000 g/mol, 60000 g/mol as well as corresponding intermediate values, for example 13000 g/mol, 13250 g/mol, 13500 g/mol, 13750 g/mol, 14000 g/mol, 14250 g/mol, 14500 g/mol, 14750 g/mol, 15000 g/mol, 15250 g/mol, 15500 g/mol, 15750 g/mol, 16000 g/mol, 16250 g/mol, 16500 g/mol, 16750 g/mol, 17000 g/mol, 17250 g/mol, 17500 g/mol, 17750 g/mol, 18000 g/mol, 18250 g/mol, 18500 g/mol, 18750 g/mol, 19000 g/mol, 19250 g/mol, 19500 g/mol, 19750 g/mol, 20000 g/mol, 20250 g/mol, 20500 g/mol, 20750 g/mol, 21000 g/mol, 21250 g/mol, 21500 g/mol, 21750 g/mol, 22000 g/mol, 22250 g/mol, 22500 g/mol, 22750 g/mol, 23000 g/mol or 31000 g/mol, 31250 g/mol, 31500 g/mol, 31750 g/mol, 32000 g/mol, 32250 g/mol, 32500 g/mol, 32750 g/mol, 33000 g/mol, 33250 g/mol, 33500 g/mol, 33750 g/mol, 34000 g/mol, 34250 g/mol, 34500 g/mol, 34750 g/mol, 35000 g/mol, 35250 g/mol, 35500 g/mol, 35750 g/mol, 36000 g/mol, 36250 g/mol, 36500 g/mol, 36750 g/mol, 37000 g/mol, 37250 g/mol, 37500 g/mol, 37750 g/mol, 38000 g/mol, 38250 g/mol, 38500 g/mol, 38750 g/mol, 39000 g/mol, 39250 g/mol, 39500 g/mol, 39750 g/mol, 40000 g/mol, 40250 g/mol, 40500 g/mol, 40750 g/mol, 41000 g/mol, 41250 g/mol, 41500 g/mol, 41750 g/mol, 42000 g/mol, 42250 g/mol, 42500 g/mol, 42750 g/mol, 43000 g/mol, 43250 g/mol, 43500 g/mol, 43750 g/mol, 44000 g/mol, 44250 g/mol, 44500 g/mol, 44750 g/mol, 45000 g/mol, 45250 g/mol, 45500 g/mol, 45750 g/mol, 46000 g/mol, 46250 g/mol, 46500 g/mol, 46750 g/mol, 47000 g/mol, 47250 g/mol, 47500 g/mol, 47750 g/mol, 48000 g/mol, 48250 g/mol, 48500 g/mol, 48750 g/mol, 49000 g/mol, 49250 g/mol, 49500 g/mol, 49750 g/mol, 50000 g/mol etc. are to be understood. By the selection of a polyvinyl alcohol and/or polyvinyl alcohol copolymer with the mentioned degree of polymerization and/or molecular weight, increase of the total solid content of the aqueous composition without increasing the viscosity can be advantageously achieved. In other words, even with total solid contents up to 55% by wt., comparatively low viscosities are possible such that application of the aqueous composition with different usual application tools is possible. Hereby, a particularly fast coating and cross-linking with at the same time short drying times and high substrate speeds is allowed, whereby highly effective barrier layers can be correspondingly fast and inexpensively produced. Generally, for producing a barrier layer, a mixture of polyvinyl alcohols/polyvinyl alcohol copolymers with different degrees of hydrolysis and/or different degrees of polymerization and/or different molecular weights can also be used. Via this, the chemical and physical characteristics of the barrier layer can be exactly adapted to the respective purpose of application of the packaging material as well as to the application method used for applying the aqueous composition. By the variation of the degree of hydrolysis and/or the degree of polymerization and/or the molecular weight, for example, the porosity, the solubility and the crystallinity of the layer can be adjusted according to requirement of the application. Thereby, in particular, the flexibility and the expansibility of the resulting barrier layer can be optimally adapted to the respective requirements.

Further advantages arise by using an aqueous composition, which includes at least one further polymer and/or copolymer as an additive. Hereby, higher total solid contents are allowed, wherein the further polymer and/or copolymer in turn can be used for improving the barrier effect of the barrier layer and/or for adjusting the viscosity of the aqueous composition.

Further advantages arise if the at least one further polymer and/or copolymer are dispersed in the aqueous composition and/or that the at least one further polymer and/or copolymer are selected from a group including poly(meth)acrylates, polymethyl(meth)acrylates, polyamides, biopolymers, in particular chitosan, polyurethanes, polyvinylacrylates, polyesters, in particular poly(meth)acrylic acid esters, polyvinylesters, polylactic acid esters, polyhydroxyalkanoates, polyhydroxybutyrate and/or polyhydroxybutyric acid, and/or copolymers hereof. This allows a particularly fast and inexpensive production of high-quality blocking or barrier layers. The expression "(meth)acrylate" generally denotes acrylates and/or methacrylates within the scope of the present invention.

In a further advantageous configuration of the invention, it is provided that at least one olefinically saturated and/or unsaturated compound with at least one functional group selected from aldehyde, carboxylic acid, acid anhydride and amino group, and/or iron chloride and/or an alkylorthosilicate, in particular tetraethylorthosilicate, and/or an urea formaldehyde resin and/or a physical cross-linker, in particular carboxymethylcellulose, is used as the cross-linking agent. Hereby, the chemical and physical characteristics of the barrier layer can be particularly exactly adapted to the purpose of application of the packaging material as well as to the respective coating and drying method. Suitable olefinically saturated and/or unsaturated cross-linking agents are for example glyoxal, glutaraldehyde, acrylaldehyde, malonic acid, glutaric acid, adipic acid, citric acid, butanetetracarboxylic acid, acrylic acid, polyacrylic acid, methacrylic acid, maleic acid, methacrylmethyl ester or hydroxyethylmethacrylate as well as any mixtures from them as well as polymerizates and/or copolymerizates thereof. For example, polyacrylic acid and/or polymethacrylic acid (summarized by the term "poly(meth)acrylic acid" in the following) can be used, the acid groups of which can be esterified with the alcohol groups of the polyvinyl alcohol. Generally, other polyalkylacrylic acids such as for example polyethylacrylic acid can of course also be used.

Alternatively or additionally, iron chloride ($FeCl_3$), tetraethylorthosilicate and/or a urea formaldehyde resin and/or a physical cross-linker can be used as the cross-linking agent. The use of iron chloride offers advantages in particular in the production of packaging material for food since the aqueous composition can be formed free of compounds undesired in the food area such as for example chromates or the like. Preferably, the urea formaldehyde resin is based on water to ensure a good miscibility in the aqueous composition. Such urea formaldehyde resins known per se are for example available under the trade name Urecoll. The physical cross-linking of the polyvinyl alcohol or the polyvinyl alcohol copolymers results from a more or less stable aggregation of functional groups or chain sections with the physical cross-linker without formation of chemical bonds. Since the physical cross-linking is thermo-reversible in contrast to a cross-linking via covalent bonds, the hard domains can be again broken down by heating to temperatures, which are higher than the glass temperatures or melting temperatures thereof. Therefore, the resulting barrier layer can be advantageously thermoplastically processed.

Further advantages arise by using an aqueous composition, which includes between 0.01 and 55 portions of weight of cross-linking agent related to 100 portions of weight of polyvinyl alcohol and/or which includes between 1 and 60 portions of weight of a filler and/or of a pigment related to 100 portions of weight of polyvinyl alcohol. By a portion of weight between 0.01 and 60, in particular, portions of weight of 0.01, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 as well as corresponding intermediate values are to be understood. By the weight portion of the cross-linking agent being in the mentioned range between 0.01 and 55 portions of weight, the cross-linking level of the polyvinyl alcohol and thereby the elasticity and the barrier characteristic of the barrier layer can be optimally adapted to the respective purpose of application. Generally, organic, inorganic as well as organic-inorganic modified particles are suitable as fillers and/or pigments, which are provided with or without swelling capability in water. Among other things, the use of a filler and/or pigment allows adaptation of the optical impression of the packaging material as well as a better printability. Moreover, suitable fillers and/or pigments form an additional "mechanical" barrier against the passage of hydrophobic compounds. The barrier effect of the barrier layer can therefore be advantageously increased by the addition of fillers and/or pigments. In particular, kaolin, sheet silicates like montmorillonite, bentonite, vermiculite, laponite, hectorite, saponite as well as silica and aluminosilicates are suitable as inorganic fillers. Celluloses—for example in the form of fibers or as micro- and nano-fibrillated cellulose—as well as other polysaccharides—for example chitosan, cellulose derivatives, hemicelluloses or modified/unmodified starch—can be employed as organic fillers. A physical cross-linking based on hydrogen bridge bonds with the polyvinyl alcohol is also achieved by the employment of fillers and pigments, which have and/or can form OH groups on the surface in aqueous environment.

Further advantages arise if a filler and/or a pigment is used, which is acid-stable and/or has at least substantially spherical and/or platelet-shaped particle geometries. Therein, acid-stable fillers and/or pigments are in particular advantageous if the polyvinyl alcohol is cross-linked in acidic environment. In particular, in this case, it is preferred if the aqueous composition is free of acid-labile compounds such as for example starch or the like. By spherical and/or platelet-shaped particle geometries, a particularly high barrier effect can be achieved since the path of the hydrophobic compounds to be traveled is considerably extended by the labyrinthine arrangement of the fillers and/or pigments in the barrier layer. In order to increase the total solid content and at the same time keep the viscosity of the aqueous composition in a well processable range, furthermore, addition of colloidal dispersions can be effected, which increase the solid content and do not impair or even improve the barrier effect with respect to hydrophobic substances. For example, all types of acrylate dispersions can be regarded as colloidal dispersions, the particles of which are colloidally dispersed. Further additives, which in particular advantageously operate in drying the barrier layer(s), are microcrystalline celluloses. By addition of low portions, for example <2% by wt., of these cellulose types, the water retention behavior and thus the layer formation in the drying process is improved.

In a further advantageous configuration of the invention, it is provided that a pH value of the aqueous composition is adjusted to a value between 1 and 7, in particular between 1.5 and 3.5, before application to the substrate and/or that the aqueous composition is degassed before application to the substrate. By adjusting the pH value of the aqueous composition to a value of 1.0, 1.5, 2.0, 2.5, 3.0, 3.5, 4.0, 4.5, 5.0, 5.5, 6.0, 6.5 or 7.0 or to a corresponding intermediate value, the cross-linking speed of the polyvinyl alcohol or the polyvinyl alcohol copolymer can be specifically varied. Hereby, the method can be optimally adapted to the characteristics of the used base material, to the respectively used application method of the aqueous composition as well as to the used drying method. By degassing the aqueous composition, possible blistering in the barrier layer is reliably prevented and a consistently high barrier effect over the coated substrate surface is achieved.

In a further advantageous configuration of the invention, an aqueous composition is used, which has a viscosity between 150 mPas and 2500 mPas, in particular between 200 mPas and 1700 mPas. By a viscosity between 150 mPas and 2500 mPas, in particular viscosities of 150 mPas, 200 mPas, 250 mPas, 300 mPas, 350 mPas, 400 mPas, 450 mPas, 500 mPas, 550 mPas, 600 mPas, 650 mPas, 700 mPas, 750 mPas, 800 mPas, 850 mPas, 900 mPas, 950 mPas, 1000 mPas, 1050 mPas, 1100 mPas, 1150 mPas, 1200 mPas, 1250 mPas, 1300 mPas, 1350 mPas, 1400 mPas, 1450 mPas, 1500 mPas, 1550 mPas, 1600 mPas, 1650 mPas, 1700 mPas, 1750 mPas, 1800 mPas, 1850 mPas, 1900 mPas, 1950 mPas, 2000 mPas, 2050 mPas, 2100 mPas, 2150 mPas, 2200 mPas, 2250 mPas, 2300 mPas, 2350 mPas, 2400 mPas, 2450 mPas or 2500 mPas as well as corresponding intermediate values such as for example 200 mPas, 201 mPas, 202 mPas, 203 mPas, 204 mPas, 205 mPas, 206 mPas, 207 mPas, 208 mPas, 209 mPas, 210 mPas etc. are to be understood. Hereby, the aqueous composition can be optimally adapted to the respectively used application method such that in any case a continuous and uniform layer thickness can be achieved. Therein, a low viscosity, in particular in the range between about 150 mPas and about 1000 mPas, is in particular suitable for non-contact application methods such as for example curtain coating methods, casting or spraying. In contrast, a higher viscosity, in particular up to about 1700 mPas, allows improved application by means of doctor blade (optionally corrugated), blade, film press and the like, for example for producing a barrier layer serving at the same time as a conditioning coat. In using curtain coating methods, it is preferred if multi-layer coating curtains are not used. Hereby, it is possible to simply collect excess aqueous composition and to use it for a new coating passage without undesired mixing of aqueous compositions of different composition being able to occur. Similarly, the aqueous composition can be applied to the substrate with the aid of multi-layer slit nozzles. The viscosity of the aqueous composition can for example be determined under SATP conditions, that is with T=298.15 K corresponding to 25° C. and p=101,300 Pa (1.013 bar).

Further advantages arise if the aqueous composition is applied to the substrate such that an area-related dry mass between 1 g/m$^2$ and 20 g/m$^2$, in particular between 3 g/m$^2$ and 15 g/m$^2$, results. Within the scope of the invention, by an area-related dry mass between 1 g/m$^2$ and 20 g/m$^2$, in particular area-related dry masses of 1 g/m$^2$, 2 g/m$^2$, 3 g/m$^2$, 4 g/m$^2$, 5 g/m$^2$, 6 g/m$^2$, 7 g/m$^2$, 8 g/m$^2$, 9 g/m$^2$, 10 g/m$^2$, 11 g/m$^2$, 12 g/m$^2$, 13 g/m$^2$, 14 g/m$^2$, 15 g/m$^2$, 16 g/m$^2$, 17 g/m$^2$, 18 g/m$^2$, 19 g/m$^2$ or 20 g/m$^2$ as well as corresponding intermediate values are to be understood. Hereby, the barrier effect of the barrier layer can be adapted to base materials or packaging situations differently loaded with hydrophobic compounds. For slightly loaded base materials or for packaging material, which presumably will be exposed to low amounts of hydrophobic compounds, correspondingly lower application amounts are sufficient. In contrast, greater application amounts can be used to correspondingly increase the barrier effect of the barrier layer. Beside it, the application amount can be varied depending on the used application method to generate a uniform barrier layer with a sufficiently high barrier effect. Due to the transverse cross-linking of the polyvinyl alcohol, therein, generally considerably lower application amounts are sufficient in contrast to the prior art, to achieve a sufficient barrier effect. Hereby, in particular with a mass-produced article like packaging material, considerable cost savings arise. Moreover, in contrast to the prior art, it is generally not required to form complex multi-layered layer systems on the surface of the substrate to ensure a sufficient barrier effect.

Alternatively or additionally, it can be provided that the aqueous composition is applied to the substrate such that the layer has a wet film thickness between 1 µm and 1000 µm, in particular between 10 µm and 200 µm. Hereby, the aqueous composition can be uniformly applied and correspondingly uniformly dried in particular depending on the water absorbing capacity of the respective substrate. Moreover, unnecessary losses of aqueous composition during coating are avoided such that the barrier layer can be particularly economically produced with a consistently high quality in this manner. By a wet film thickness between 1 µm and 1000 µm, for example, wet film thicknesses of 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990 or 1000 µm as well as corresponding intermediate values such as for example 10, 11, 12, 13, 14, 15, 16, 17, 18, 19, 20 µm etc. are to be understood. Furthermore, via the wet film thickness, the thickness of the dry barrier layer can be specifically adjusted. For example, with the aid of a blocking or barrier layer of 20 µm, improvement of the barrier effect over an observation period of time of 730 days (2 years) at 20° C. from 0.23 to 0.094 mg/kg (i.e. below the limit value of 0.15 mg/kg) could be improved. The contact area was 16.5 dm$^2$ with a filling material of 375 g. The cardboard substrate had an initial concentration of 150 mg/kg of mineral oil.

In a further advantageous configuration of the invention, it is provided that the aqueous composition is applied to the substrate by means of an equalizing coating method, in particular by means of doctor blade, blade and/or film press and/or by means of a contour coating method, in particular by means of casting, spraying, curtain coating and/or airbrush. The use of an equalizing coating method allows material smoothing and is particularly convenient in that optionally subsequent non-contact application methods largely maintain the contour of the surface of the substrate. This means that a rough surface contour of the base material or the substrate is equalized with the aid of an equalizing coating method and thereby smoothed. Usually, higher product quality is achieved, the smoother the material web is. In this context, it has turned out that it is more advantageous for most of the applications to first smooth the substrate and then to apply the barrier layer than to subsequently smooth a rough contour of the barrier layer. By the use of equalizing or leveling coating methods, a smooth surface can be produced on rough substrates all in all. This smooth surface is then particularly suitable for a subsequent application of contour coating methods.

The use of contour coating methods offers the basic advantage that pressure is not exerted in the contact position between base material and aqueous composition such that deep penetration of the aqueous composition into the base material is avoided. Hereby, particularly uniform barrier layers can be produced. At the same time, particularly low application amounts of aqueous composition are required to achieve a desired barrier layer effect, whereby the method can be particularly economically performed.

In a further advantageous configuration of the invention, it is provided that the aqueous composition is applied to the substrate at a temperature between 30° C. and 85° C., in particular between 35° C. and 80° C. For example, the aqueous composition can have a temperature of 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C. or 85° C. The higher the temperature of the composition is selected, the faster the applied layer can be dried. This allows the use of usual application apparatuses with short drying paths, whereby corresponding time, energy and cost savings are realizable. Moreover, influence can be specifically exerted on the viscosity of the aqueous composition as well as on the cross-linking speed via the temperature.

Further advantages arise by drying the coated substrate in step c) by means of infrared irradiation and/or by means of convection and/or under UV irradiation and/or drying the coated substrate (12) up to a residual humidity between 3% by wt. and 12% by wt., in particular between 6% by wt. and 10% by wt. Hereby, the drying of the applied layer and the cross-linking of the polyvinyl alcohol/polyvinyl alcohol copolymer can be optimally controlled depending on the used cross-linking agent. Moreover, the desired residual humidity content can also be precisely adjusted. Therein, the irradiation with UV light can be performed alternatively or additionally to infrared irradiation and/or convection and is in particular advantageous in using iron chloride ($FeCl_3$) as the cross-linking agent to initiate the cross-linking reaction. Further advantages arise if the coated substrate is dried to a residual humidity between 3% and 12%, in particular between 6% and 10%, in the base material in step c). By a residual humidity in the range of 3%, 4%, 5%, 6%, 7%, 8%, 9%, 10%, 11% or 12%, it is ensured that the packaging material has optimum mechanical characteristics and can be further processed to a packaging in a manner free of damage. The mentioned residual humidities are in particular advantageous in using base materials at least partially composed of recycling fibers to avoid undesired breaking or shortening of the pulp fibers in folding, cutting or other further processing of the packaging material.

In further configuration of the invention, in step a), a substrate is provided, which includes a base material, the outer side and/or inner side of which is provided with a conditioning layer and/or a cover layer. In other words, it is provided that the base material coated with the aqueous composition in step b) is already provided with a layer, on which the barrier layer of cross-linked polyvinyl alcohol/ polyvinyl alcohol copolymer is generated. The conditioning layer and/or the cover layer can for example be a layer including polyvinyl alcohol/polyvinyl alcohol copolymer, which is preferably filled with spherical or platelet-shaped pigments. Herein, it is advantageous that the conditioning coat already has barrier characteristics with respect to hydrophobic substances and is additionally protected from damage by the barrier layer generated on the conditioning coat with cross-linked polyvinyl alcohol. Furthermore, it can be provided that the provided substrate is glued. This is in particular advantageous in severely absorbent substrates to decrease the suction effect and thus to improve the coating quality and to decrease the material input of aqueous composition. Furthermore, it can be provided that the provided substrate is provided with a cover and/or conditioning layer of another polymer, for example a poly(meth)acrylate. The cover layer can generally be provided with pigments and/or fillers and/or cross-linkers. The elasticity in processing the packaging material is thereby not impaired.

Further advantages arise if the conditioning layer and/or the cover layer include non-cross-linked polyvinyl alcohol and/or are composed of non-cross-linked polyvinyl alcohol. In particular, it can be provided that the conditioning layer and/or the cover layer are formed free of cross-linked polyvinyl alcohol, wherein it is not excluded hereby that the conditioning layer and/or the cover layer optionally include further components such as for example fillers and/or pigments besides non-cross-linked polyvinyl alcohol. Hereby, the elasticity and flexibility of the packaging material can be advantageously increased. Moreover, in this manner, it is ensured that the barrier layer generated on the conditioning layer and/or cover layer in the further course of procedure is not damaged in the further processing of the packaging material—for example in punching, cutting or gluing—and its barrier effect is maintained. By the conditioning layer and/or the cover layer including non-cross-linked polyvinyl alcohol or consisting completely of non-cross-linked polyvinyl alcohol or being free of cross-linked polyvinyl alcohol, the barrier effect of the barrier layer with respect to hydrophobic compounds is further additionally improved without restrictions with regard to the biological degradability of the packaging material having to be accepted.

In a further configuration of the invention, it is provided that the steps b) and c) are repeated at least once and/or at most three times. Hereby, a layer system of two, three of four barrier layers can be formed on the inner side of the base material, whereby a particularly high barrier effect is achieved. For example, this is advantageous in packagings, which are transported over the sea route or which are exposed to different climatic conditions over a longer time. A further advantage of multiple application of the aqueous composition or the formation of two or more barrier layers on the inner side is in that possible overlaps of blisters in the individual barrier layers are particularly reliably excluded. Therein, the barrier layers can be generally identically or differently formed. If the steps b) and c) are performed multiple times one after the other, excess aqueous composition can be simply collected and reused for a new procedure passage, whereby the procedure cost are considerably lowered.

Further advantages arise if the substrate is coated with a further aqueous composition before step a) and/or after step c), wherein the further aqueous composition includes at least polyvinyl alcohol and/or a polyvinyl alcohol copolymer and is free of cross-linking agents. In this manner, a base and/or cover layer of non-cross-linked polyvinyl alcohol/polyvinyl alcohol copolymer can be produced, whereby the layer system formed on the base material of the substrate has improved flexibility and expansibility.

Therein, in further configuration, it has proven advantageous if the further composition has a content of polyvinyl alcohol/polyvinyl alcohol copolymer of at most 4% by wt. if it is formed free of additives such as fillers and/or pigments, or if the further composition has a total solid content of at most 55% by wt. if it is provided with fillers and/or pigments. Hereby, the viscosity of the further aqueous composition can be optimally matched to the respectively used application method. In addition, the storage stability of the aqueous composition is thereby improved. Further advantages arise from the preceding descriptions.

A further aspect of the invention relates to a packaging material including a substrate, which has a base material of pulp (cellulose), an outer side to be faced away from the packaging item as well as an inner side to be faced towards the packaging item, as well as a layer system disposed on the inner side of the substrate with at least one barrier layer for hydrophobic compounds, wherein the barrier layer includes cross-linked polyvinyl alcohol and/or a cross-linked polyvinyl alcohol copolymer. The packaging material according to the invention has an excellent barrier effect with respect to hydrophobic compounds with at the same time high humidity resistance and can be particularly simply and inexpensively produced in contrast to the prior art since only inexpensive starting materials are required and can be fast and simply processed with the aid of usual fabrication plants. The packaging material according to the invention additionally guarantees the food safety of the packaging item due to its barrier effect with respect to hydrophobic compounds—such as for instance mineral oil components of recycling material or of imprints. At the same time, it obtains the ecological advantages of a packaging economy based on waste paper. The further arising advantages can be taken from the preceding descriptions, wherein advantageous embodiments of the method are to be considered as advantageous embodiments of the packaging material and vice versa.

Therein, it has proven advantageous in a configuration of the invention if the packaging material is obtainable and/or obtained by a method according to the first inventive aspect. The features arising from it and the advantages thereof are to be taken from the corresponding descriptions of the first inventive aspect.

Further advantages arise if the barrier layer is at least predominantly composed of cross-linked polyvinyl alcohol. In other words, it is provided that the barrier layer is 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% formed of cross-linked polyvinyl alcohol and/or polyvinyl alcohol copolymer. Hereby, in particular the flexibility, the expansibility, the barrier effect and the printability of the barrier layer can be particularly simply adapted to the respective purpose of application.

An additionally improved barrier effect is achieved in further configuration of the invention in that the layer system includes at least two barrier layers of cross-linked polyvinyl alcohol and/or polyvinyl alcohol copolymer.

A particularly specific barrier effect with respect to different hydrophobic compounds is achieved in a further advantageous configuration of the invention by the at least two barrier layers including polyvinyl alcohol/polyvinyl alcohol copolymers with different cross-linking levels and/or polyvinyl alcohols/polyvinyl alcohol copolymers with different degrees of hydrolysis and/or polyvinyl alcohols/polyvinyl alcohol copolymers cross-linked by different cross-linking agents.

In a further advantageous configuration of the invention, it is provided that the barrier layer including polyvinyl alcohol and/or a polyvinyl alcohol copolymer includes organic, inorganic and/or organic-inorganic modified particles, which have a spherical or platelet-shaped particle geometry. The use of such particles allows adaptation of the optical impression of the packaging material as well as better printability among other things. Moreover, suitable particles form an additional "mechanical" barrier against the passage of hydrophobic compounds. The barrier effect of the barrier layer can therefore advantageously be increased by the addition of these particles, which can function as filler and/or pigments. In particular, kaolin, sheet silicates like montmorillonite, bentonite, vermiculite, hectorite, saponite, laponite as well as silica and aluminosilicates or mixtures thereof have proven advantageous herein.

Furthermore, it has proven advantageous if the layer system includes at least one layer containing non-cross-linked polyvinyl alcohol and/or a non-cross-linked polyvinyl alcohol copolymer. Preferably, this layer is formed free of cross-linked polyvinyl alcohol/polyvinyl alcohol copolymer and without addition of cross-linking agents, respectively. Hereby, the flexibility and expansibility of the layer system is advantageously increased such that a possible damage of the barrier layer in the further processing of the packaging material according to the invention is particularly reliably prevented.

In a further advantageous configuration of the invention, it is provided that the layer containing non-cross-linked polyvinyl alcohol and/or non-cross-linked polyvinyl alcohol copolymer is disposed directly on the inner side of the substrate and/or between two barrier layers and/or on a side of the barrier layer facing away from the base material. In other words, it is provided that the layer containing non-cross-linked polyvinyl alcohol or non-cross-linked polyvinyl alcohol copolymer forms the base and/or the terminating cover layer with respect to the base material and/or is formed between two barrier layers containing cross-linked polyvinyl alcohol/polyvinyl alcohol copolymer. This allows particularly good adaptation to different purposes of use of the packaging material and also increases the barrier effect with respect to hydrophobic compounds besides the flexibility and expansibility of the layer system.

BRIEF DESCRIPTION OF THE DRAWING FIGURES

Figure 2:
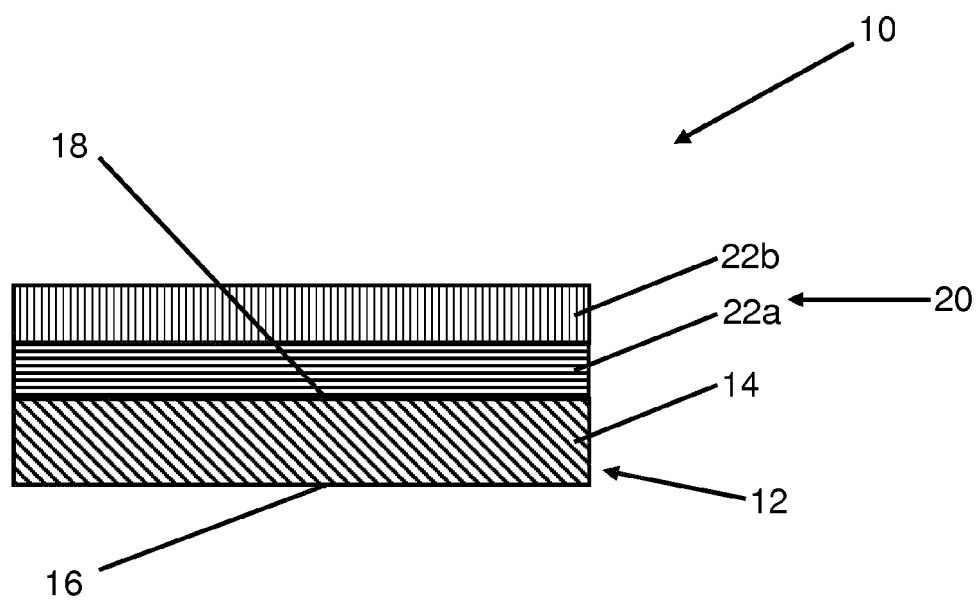

Further features of the invention are apparent from the claims, the embodiments as well as based on the drawing. The features and feature combinations mentioned above in the description as well as the features and feature combinations mentioned below in the embodiments are usable not only in the respectively specified combination, but also in other combinations without departing from the scope of the invention. There show:

FIG. 1 a schematic lateral sectional view of a packaging material according to the invention according to a first embodiment; and FIG. 2 a schematic lateral sectional view of a packaging material according to the invention according to a second embodiment.

DESCRIPTION OF THE INVENTION

FIG. 1 shows a schematic lateral sectional view of a packaging material 10 according to the invention according to a first embodiment. The packaging material 10 includes a substrate 12 consisting of a base material 14 and having an outer side 16 to be faced away from a packaging item as well as an inner side 18 to be faced towards the packaging item. In the present embodiment, the base material 14 is a cardboard with an area-related mass of 400 g/m$^2$. On the inner side 18 of the substrate 12, a layer system 20 is formed, which is produced by generating a first barrier layer 22a, a second barrier layer 22b as well as a layer 24 functioning as a cover layer. The barrier layers 22a, 22b include cross-linked polyvinyl alcohol. Moreover, the barrier layer 22a includes platelet-shaped or spherical particles or mixtures thereof as a filler and/or pigment. Thereby, the barrier layers 22a, 22b at least largely impede or prevent the migration of hydrophobic compounds through the layer system 20.

Therein, the transverse cross-linking of the polyvinyl alcohol described in more detail below provides for increased mechanical stability and prevents swelling of the barrier layers 22a, 22b if they come into contact with humidity.

Generally, organic, inorganic as well as organic-inorganic modified particles provided with or without swelling capability in water are suitable as fillers and/or pigments. In the present embodiment, the barrier layer 22a includes kaolin. Therein, kaolin offers the advantage that it is acid-stable and does not swell in water. Moreover, the used kaolin is composed of platelet-shaped particles, which form a mechanical barrier and hereby additionally aggravate or prevent the migration of compounds through the barrier layer 22a. In contrast, the second barrier layer 22b is exclusively composed of cross-linked polyvinyl alcohol, wherein polyvinyl alcohols with different degrees of hydrolysis and polymerization are used for producing the two barrier layers 22a, 22b and have been cross-linked by different cross-linking agents. However, generally, the two barrier layers 22a, 22b can of course also include the same cross-linked polyvinyl alcohol. In contrast, the terminating layer 24, which is in contact with the packaging item in a subsequent packaging formed of the packaging material 10, is composed of non-cross-linked polyvinyl alcohol and in particular increases the flexibility and expansibility of the layer system 20. Alternatively or additionally, it can be provided that the layer 24 is formed directly on the substrate 12 and/or between the barrier layers 22a, 22b.

In the shown embodiment, the outer side 16 of the substrate 12 is not coated. However, generally, one or more layers can also be provided on the outer side 16 to achieve certain characteristics of the packaging material 10, for example a better printability or a gas and/or humidity barrier effect. Similarly, the outer side 16 can be printed, embossed, satinized or otherwise treated.

Generally, the substrate 12 can be pre- or post-treated before, during and/or after application of the layer system 20. For example, the substrate 12 or the packaging material 10 can be calandered, for example embossed, smoothed, densified and/or satinized. Hereto, for example, conventional calenders, shoe calenders, belt calenders (metal belt, plastic belt etc.), smoothing presses or smoothing cylinders can be used. However, other treating methods can generally also be provided.

FIG. 2 shows a schematic lateral sectional view of a packaging material 10 according to the invention according to a second embodiment. The base material 14 is again a cardboard with an area-related mass of 400 g/m². In contrast to the preceding embodiment, the layer system 20 does not include a layer 24 without cross-linked polyvinyl alcohol or without cross-linked polyvinyl alcohol copolymer. Instead, the layer system 20 has a first barrier layer 22a, which is obtained by coating the substrate 12 with an aqueous composition, which includes polyvinyl alcohol or a polyvinyl alcohol copolymer, pigments, fillers, additives as well as a cross-linker. Furthermore, the layer system 20 includes a second barrier layer 22b, which functions as a cover layer and is obtained by coating the first barrier layer 24a with an aqueous composition, which also includes polyvinyl alcohol or a polyvinyl alcohol copolymer, pigments, fillers, additives as well as a cross-linker.

Generally, the barrier layers 22a, 22b in FIG. 1 and FIG. 2 can contain the same components. Differences between the barrier layers 22a, 22b arise by the different addition of pigments, fillers and/or additives, for example in the form of colloidal polymer dispersions. The second barrier layer 22b exhibits excellent flexibility despite of the addition of pigment and cross-linker, which positively effects on the further processing process of the packaging material 10. As a further additive, for example, microcrystalline cellulose can be employed, which positively effects on the water retention behavior. Due to the crystalline structure, an additional barrier efficiency is already given with addition of small amounts (e.g. ≤1% by wt.). If it is required, a further layer 24 of non-cross-linked PVOH or non-cross-linked polyvinyl alcohol copolymer can also be applied in the second embodiment to further improve the flexibility and expansibility of the packaging material 10 as needed.

In the following, various further embodiments for producing the packaging material 10 according to the invention with barrier characteristics with respect to non-polar chemical compounds are listed.

1. Production of an Aqueous Polyvinyl Alcohol Solution

If the polyvinyl alcohol or the water-soluble polyvinyl alcohol copolymer is not already present dissolved in water, the production of a polyvinyl alcohol (copolymer) solution is performed as follows:

First, a defined amount of cold water is provided. Subsequently, a defined amount of an optionally finely ground polyvinyl alcohol powder (analogously: polyvinyl alcohol copolymer powder) with a degree of hydrolysis, which is preferably between 80% and 99.9%, is stirred in with severely stirring (2000 rpm) at a temperature of 75° C. to 80° C. within 30 to 45 minutes with an intensive or dissolver stirrer. The dissolving process is terminated as soon as the solution is clear. The still warm solution is cooled down to 25° C. Before the further use, the exact solid content of the solution is determined for example by means of a thermobalance and optionally adjusted to a value between 5% by wt. and 15% by wt. The determined or adjusted solid content serves as a basis for the further course of procedure and in particular for determining the layer thickness to be applied to the substrate as well as for amount determination of the cross-linking reagents to be added. The pH value of the obtained polyvinyl alcohol solution is neutral.

After the cooling operation is terminated, the pH value of the freshly prepared polyvinyl alcohol solution is adjusted as needed. The adjustment of the pH value is effected in a manner known per se by addition of a suitable acid or base. For example, mineral acids such as for instance concentrated hydrochloric acid or bases as sodium hydroxide are suitable.

Alternatively, it can be provided that the polyvinyl alcohol (PVOH) or the polyvinyl alcohol copolymer is dissolved at temperatures between 75° C. and 95° C., wherein a content of the aqueous solution in terms of polyvinyl alcohol (copolymer) is adjusted to maximally 40% by wt., for example to 30% by wt.

2. Production of an Aqueous Composition 2.1 Glyoxal as the Cross-Linking Agent

To the polyvinyl alcohol solution produced according to item 1., a 40% glyoxal solution is added at room temperature (25° C.) with severely stirring within about 15 minutes with simultaneous adjustment of the pH value of the solution to pH=3 to obtain an aqueous composition for coating the substrate 12. The amount of glyoxal to be added ranges between 5 and 40% by wt. related to 100% by wt. of polyvinyl alcohol.

After 15 minutes, the aqueous composition is degassed at an initial negative pressure of −200 mbar, which is subsequently slowly increased to −500 mbar to −600 mbar. If the vacuum is further increased (e.g. to above −800 mbar, i.e. to a pressure of about 200 mbar), the water begins to boil and condensate deposits on the walls of the vacuum container. Finally, the aqueous composition is degassed at a pressure of about 100 mbar without further stirring.

After termination of the degassing, the aqueous composition can be applied to the substrate 12, wherein the polyvinyl alcohol is cross-linked by the glyoxal.

2.2 Adipic Acid (AS), Glutaric Acid (GS) and/or Maleic Acid (MS) as the Cross-Linking Agent The addition of the mentioned dicarboxylic acids can be divided into two sub-categories:

AS and GS belong to the group of the saturated dicarboxylic acids, wherein AS is poorly (24 g/l) and GS is easily (640 g/l) soluble in cold water (20° C.). The condensation reactions of both acids with polyvinyl alcohol are preferably catalytically assisted by addition of mineral acids (e.g. hydrochloric acid) by adjusting the pH value of the aqueous composition to pH=3.

MS is an unsaturated dicarboxylic acid, which is very well water-soluble (788 g/l, 20° C.) and reacts severely acidic in aqueous solution. MS is present in cis form. By UV radiation and extended heating at 150° C., it transforms into the trans form (fumaric acid), which optionally can be taken into account in the transverse cross-linking reaction. In using the MS, therefore, additional pH adjustment of the aqueous composition is usually not required. According to used amount, the pH value is between 1.6 and 3.2 depending on the amount of MS dissolved in the aqueous polyvinyl alcohol solution. The added total amount of dicarboxylic acid generally ranges between 5 and 25% by wt. related to 100% by wt. of polyvinyl alcohol.

The aqueous composition including polyvinyl alcohol and one or more of the mentioned dicarboxylic acids is subsequently heated to 70° C., intensively stirred at 70° C. for 15 minutes and then cooled down to 25° C. Now, the pH value can be adjusted as needed corresponding to the respectively employed dicarboxylic acid. After pH value adjustment of the aqueous composition, preferably, the above described degassing step is effected.

2.3 Iron Chloride ($FeCl_3$) as the Cross-Linking Agent

The addition of $FeCl_3$ to the polyvinyl alcohol solution is preferably effected at 25° C. with severe stirring. $FeCl_3$ can be present as a solid or already dissolved in water. The added amount of $FeCl_3$ ranges between 1 and 15% by wt. related to 100% by wt. of polyvinyl alcohol. The mixing time is 15 minutes at 25° C. A pH value adjustment is not required if further cross-linking agents are not provided. Before applying to the substrate 12 to be coated, a degassing step is recommended here too.

2.4 Polyacrylates as the Cross-Linking Agent

Within the scope of the present invention, by polyacrylates, derivatives of the polyacrylic acid having the general formula

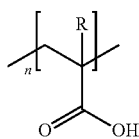

are understood, wherein R denotes hydrogen or unsubstituted or substituted alkyl group, in particular methyl, ethyl, 1-propyl, 2-propyl, 1-butyl, 2-butyl and/or tert-butyl. Preferably, polyacrylic acids in the molecular weight range from 2000 to 1500000 g/mol, in particular from 50000 to 500000 g/mol, are used since this class is comparatively well soluble in cold water (20° C.). The added amount of polyacrylic acid ranges between 0.01 and 10% by wt. The mixing time is approximately 15 min. at 25° C. to 60° C. The pH value of the mixture can be increased as needed by addition of basic additives such as KOH, NaOH or the like. A degassing step is recommended before application.

Alternatively to a dissolver stirrer, for dissolving PVOH or for producing an aqueous solution with pigments/fillers/additives and cross-linker, a special beaker stirrer (manufacturer Viscojet) with conically tapered nozzles can be used, which prevents the input of gas bubbles into the polymer solution or filled polymer dispersion. With this stirring organ, it is possible to dissolve PVOH or a copolymer thereof in gentle and fast manner and to gently and uniformly introduce other components such as pigments, additives, cross-linkers etc. The dispersion and dissolution of the ingredients is effected similar to the dissolver stirrer. The individual ingredients are added to the aqueous provision, well wetted and distributed with the aid of the beaker stirrer.

As further additives, colloidal dispersions with high solid content (45-55%) are suitable. As the colloidal particles, for example, organic polymers can be used, which have a barrier effect with respect to hydrophobic compounds or do not impair the hydrophobic barrier effect.

2.5 Mixtures of Polyvinyl Alcohol with the Cross-Linking Agents Described Under 2.1. to 2.4.

Generally, the above mentioned cross-linking agents can be arbitrarily mixed, e.g. $FeCl_3$ with di- and/or polycarboxylic acids and/or dialdehydes.

As further additives, colloidal dispersions with high solid content (45-55%) are suitable. The colloidal particles can be organic polymers, which also have a barrier effect with respect to hydrophobic compounds or do not impair the hydrophobic barrier effect.

2.6 Introduction of Fillers and/or Pigments

Fillers and/or pigments with preferably spherical and/or platelet-shaped particles are added to the aqueous composition in a percent by weight range of 5-60% related to 100% by wt. of polyvinyl alcohol (PVOH). As fillers and/or pigments, generally, organic, inorganic and/or organic-inorganic modified particles are suitable, which are provided with or without swelling capability in water.

Spherical particles such as silica particles with specific surfaces of 200-500 g/m² can be employed. The silica particles are in solid form or in aqueous dispersions. The size of the particles ranges between 5-60 nm. Unmodified as well as (hydrophilically) modified particles can be employed. Particles are added in the range of 10-60% related to 100% by wt. of PVOH.

Alternatively, mixtures of spherical and platelet-shaped particles can be added. Platelet-shaped particles such as kaolins and sheet silicates (partially or completely exfoliated) can be employed in unmodified or modified manner. Sheet silicates can be functionalized with alkoxy silanes, which bear amino, epoxy or mercapto groups. Besides it, kaolin, montmorillonite, bentonite, vermiculite, hectorite, saponite, laponite etc. or mixtures thereof can be employed. In the employment of kaolin, a so-called "hyper-platy", nano-scaled type with a form factor of at least 40 is used. A form factor between 60 and 100 and a size of max. 1 μm is preferred.

Further fillers like natural and/or synthetic aluminosilicates with defined pore volumes of 3-10 Å, 8-13 Å and 10-15 Å or more Angstrom can be added alone or in combination with spherical or platelet-shaped fillers or be added as mixtures thereof.

Furthermore, natural organic fillers such as cellulose fibers and/or cellulose regenerate fibers, in particular micro- and nano-fibrillated celluloses, can be used as the fillers. These fillers can be used alone or in combination with one or more other fillers.

In a further configuration, it is provided that the aqueous composition is generally formed free of boron compounds such as for example borax, free of silicates swellable in water, in particular of swellable sheet silicates, and/or free of hydrogen sulfite adducts to ensure a high chemical and mechanical resistance with at the same time high food compatibility of the resulting barrier layer 22.

Besides fillers and/or pigments, additives in the form of colloidal dispersions can be added, which increase the total solid content of the aqueous composition and do not or not significantly vary the viscosity besides a barrier effect with respect to hydrophobic substances.

3. Application of the Aqueous Composition

An aqueous composition produced according to the above described recipes is applied to the coated or preferably uncoated substrate 12. The base material 14 of the substrate 12 is composed of cardboard and has a grammage between 200 g/m² and 800 g/m².

3.1 Possibilities of Application and Layer Arrangement 3.1.1 Single-Layer Wet Film Application The substrate 12 can be coated for producing a single barrier layer 22 with aqueous compositions consisting of:

polyvinyl alcohol+glyoxal;

polyvinyl alcohol+dicarboxylic acids;

polyvinyl alcohol+polyacrylic acids;

polyvinyl alcohol+dicarboxylic acids+fillers and/or pigments;

polyvinyl alcohol+polyacrylic acids+dicarboxylic acids+fillers and/or pigments;

polyvinyl alcohol+FeCl$_3$; or polyvinyl alcohol+mixture of different cross-linking agents;

polyvinyl alcohol+mixture of different cross-linking agents+fillers and/or pigments;

wherein the wet film application can be 3 to 15 g/m². Therein, it is to be emphasized that generally the substrate 12 alternatively can already be composed of a base material 14 coated with non-cross-linked polyvinyl alcohol, wherein fillers and/or pigments can be mixed to the non-cross-linked polyvinyl alcohol as required.

Further embodiments for the aqueous composition used within the scope of the invention are indicated in table 1. Therein, it is again to be emphasized that the solid content of each aqueous composition is at most 25% by wt. including possibly present fillers and/or pigments. Preferably, the solid content of each aqueous composition is at most 15% if the aqueous composition is formed free of fillers and/or pigments. The amounts of polyvinyl alcohol indicated in table 1 are always to be regarded as 100 parts. The amount of the cross-linking agent is always related to the 100 parts of polyvinyl alcohol.

TABLE 1

| Ingredients of the aqueous composition | | | | | |
|---|---|---|---|---|---|
| Main component | | | Parts | Parts | Parts |
| PVOH | Degree of hydrolysis: 80 -> 99% |  | 100 | 100 | 100 |
| Cross-linking agent/compound class | Chem. compound | Structural formula | Parts-min. number | Parts-max. number | Parts preferred |
| Dialdehydes, unsaturated aldehydes | Glyoxal | 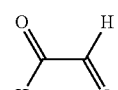 | 1 | 50 | 10-30 |
| | Glutar-aldehyde | 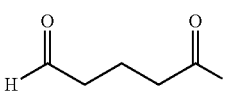 | 1 | 50 | 5-25 |
| | Acryl-aldehyde | 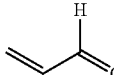 | 1 | 50 | 5-20 |
| Polycarboxylic acids, unsaturated carboxylic acids, carboxylic acid esters | Malonic acid | 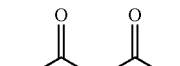 | 1 | 50 | 10-30 |

TABLE 1-continued

| | Ingredients of the aqueous composition | | | | |
|---|---|---|---|---|---|
| | Glutaric acid | (structure) | 1 | 50 | 10-30 |
| | Adipic acid | (structure) | 1 | 50 | 10-30 |
| | Citric acid | (structure) | 1 | 50 | 2-10 |
| | Butanetetra-carboxylic acid anhydride | (structure) | 0.1 | 25 | 1-10 |
| | Acrylic acid | (structure) | 0.1 | 25 | 1-10 |
| | Methacrylic acid | (structure) | 0.1 | 25 | 1-10 |
| | Maleic acid | (structure) | 0.1 | 25 | 1-10 |
| | Methacryl-methylester | (structure) | 0.1 | 25 | 5-20 |
| | Hydroxy-ethylmeth-acrylate | (structure) | 0.1 | 25 | 5-20 |
| $FeCl_3$ | $FeCl_3$ | | 0.1 | 20 | 1-10 |
| Silanes | TEOS | (structure) | 0.1 | 10 | 1-10 |

TABLE 1-continued

| Ingredients of the aqueous composition | | | | |
|---|---|---|---|---|
| Urea formaldehyde resin (e.g. Urecoll ®) | | 0.1 | 20 | 1-10 |
| Polyacrylic acid | 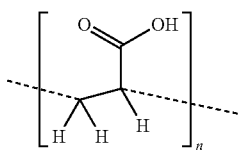 | 0.01 | 25 | 0.1-10 |

3.1.2 Multi-Layered Application

On demand, multi-layered layer systems 20 with two, three, four of five barrier layers 22 applied one after the other can be produced. An aqueous polyvinyl alcohol solution without cross-linking agent can also be used as a first conditioning coat or as a primer in this case. Alternatively or additionally, the non-cross-linked polyvinyl alcohol layer can be applied between two barrier layers 22 and/or as a terminating layer 24, as shown in FIG. 1. The non-cross-linked or cross-linked polyvinyl alcohol layer can be filled with fillers and/or pigments. The dry weight of each layer 24 and/or barrier layer 22 can again be 3 to 15 g/m².

3.2 Application Systems

The layer systems 20 described under 3.1.1. and 3.1.2. can be applied by application tools usual in the coating and paper industry by means of spraying, coating with doctor blade, casting or an equivalent contour coating method. Suitable parameter values are for example:

Roll doctor blade: 10, 20, 40, 60, 80 μm wet film thickness

Film drawing frame: variable gap setting, 0-1000 μm wet film thickness

Film drawing frame: fixed gap: 20, 40 60, 70, 100, 120 μm wet film thickness

These application tools are employed by means of a motor-controlled application system with a maximum speed of the substrate 12 of up to 1000 m/min, for example 80 mm/s or. 4.8-5 m/min for a uniform application.

Alternatively or additionally, a nozzle application system is used, which applies at least one barrier layer 22 or layer 24 and maximally four layers to the cardboard substrate 12 movable in horizontal direction at the same time. The mixing of the aqueous compositions can be effected in the nozzle chamber, in the nozzle gap (gap width e.g. 0.1-1.0 mm) or outside of the nozzle on the substrate 12. Wet film layer thicknesses above 200 μm are possible with this application method. The required delivery amount of the aqueous composition results from the parameters of "layer thickness" and "maximum speed" of the linear drive.

4. Drying and Cross-Linking of the Wet Films by Means of IR Radiation (IR), Convection Drying (KV) and/or UV Radiation (UV)

The solvent (water) of the aqueous composition applied to the substrate 12 is eliminated by infrared and/or convection dryers. Both dryer types can be used individually, collectively, consecutively or independently of each other. The dryer temperatures of both dryer types can for example be chosen between 60° C. and 200° C. Supply and exhaust air, respectively, and temperature settings of the dryers or the dryer combination are preferably selected such that a bubble-free layer system 20 arises. A residual humidity of 7-9% by wt. in the substrate 12 can be used as a criterion for the exact temperature setting.

All of the barrier layers 22 or layers 24 are preferably first dried by IR and/or KV. In aqueous compositions, which contain dialdehydes and/or dicarboxylic acids, polyacids and/or mixtures thereof as cross-linking agents (see 2.1 to 2.5), the thus supplied heat is sufficient to virtually quantitatively perform the transverse cross-linking of the polyvinyl alcohol.

The cross-linking reaction with $FeCl_3$ is a two-stage process. After the at least predominant removal of the solvent, the at least largely dry coating is irradiated with UV light. Hereto, for example, a Hg vapor high-pressure lamp can be used. The exposure of the UV-active polyvinyl alcohol layer takes about 10 s at a power of about 0.4 W/cm² with an intensity specification of 75%.

Generally, it is advisable to irradiate all of the aqueous compositions containing UV-active cross-linking agents with UV light before, during and/or after thermally drying.

5. Test Method

5.1 Measurement of the Barrier Effect with Respect to Hydrophobic Hydrocarbons The packaging material 10 shown in FIG. 1 was subjected to a migration examination with the food simulant Tenax® based on the test standards DIN EN 1186-13 and DIN EN 14338, wherein the Tenax® was applied to the layer system 20 of the packaging material 10. After incubation of the migration formulation at defined temperature and time, the migrated substances were eluted from Tenax® by means of n-hexane and the mineral oil hydrocarbons were specifically separated by means of liquid chromatography into two different fractions, namely the fraction of the saturated (mineral oil saturated hydrocarbons, MOSH) and the fraction of the aromatic hydrocarbons (mineral oil aromatic hydrocarbons, MOAH). The two fractions thus obtained were analyzed by gas chromatography and captured as sum parameters, wherein deuterated n-nonadecane and diethyl-naphthalene, respectively, were employed for the evaluation of the signal area sums. With respect to the extractable initial amount of mineral oil hydrocarbons from the raw packaging material, which defines the sum of all components capable of migrating, less than 1% of the substances capable of migrating were detected in the Tenax® eluate. Thus, the migration of the hydrophobic hydrocarbons is more than 99% prevented, and therefore it is always below a value of 0.6 mg/kg of packaged food for mineral oils.

For the maximum transition of MOSH, a temporary value of 0.6 mg/kg was set. Based thereon, for hydrocarbon compounds with a carbon number between 10 and 16 from BfR 2011, a temporary value of 12 mg/kg was set. For the MOAH components, according to draft of the 22$^{nd}$ regulation for altering the Foodstuffs and Consumer Goods Law (mineral oil regulation), a value of 0.15 mg/kg should not be detectable. The migration of hydrophobic compounds is thereby below the requested value of 0.12 mg/kg.

5.2 Layer Structure

For characterizing the layer structure of the layer system 20, a semi-thin section was manufactured, based on which the individual layers 22a, 22b and 24 were spectroscopically identified by an optical and an IR or Raman microscope. The assessment of the closeness and uniformity of the applied layer is performed by means of FTIR microscopy.

6. Further Embodiments

In the following, further embodiments for the packaging material 10 according to the invention are specified. Unless otherwise indicated, the production was effected in the above described manner.

6.1 Example 1

In the following, first, the production of a coated substrate 12 is explained:
Base material 14: Cardboard with an area-related mass between 200-800 g/m², preferably uncoated
Composition (not cross-linking) for coating:
Aqueous polyvinyl alcohol solution (Elvanol 90-50 or Elvanol 85-82, Dupont or mixtures thereof)
Solid content: 10.00% by wt.
Coating the cardboard base material 14 with the composition (40-200 μm wet film layer thickness)
Application method: Doctor blade, airbrush, nozzle
Speed of the substrate 12: up to 1000 m/min
Drying: IR & convection until achieving 5-7% of residual humidity in the base material 14.
The substrate 12 thus produced can be used as a starting material for the application of one or more barrier layers 22.

6.2 Example 2

Base material 14: cardboard with an area-related mass between 200-800 g/m², preferably uncoated
Aqueous composition (cross-linking):
Aqueous polyvinyl alcohol solution (Elvanol 90-50 or Elvanol 85-82, Dupont or mixtures thereof), pigments (according to item 2.5)
As the cross-linkers, the cross-linkers listed in item 3.1.1 or mixtures thereof are considered
Solid content: up to 25.00% by wt.
Coating the cardboard base material 14 with the aqueous composition (40-200 μm wet film layer thickness)
Application method: doctor blade, airbrush, nozzle
Speed of the substrate 12: up to 1000 m/min
Drying: IR & convection until achieving 5-7% of residual humidity in the base material 14

6.3 Example 3

Base material 14: Cardboard with an area-related mass between 200-800 g/m², preferably uncoated
Composition (not cross-linking):
Aqueous polyvinyl alcohol solution (Elvanol 90-50 or Elvanol 85-82, Dupont or mixtures thereof), filled with pigments (cf. item 2.5)
Solid content: up to 25.00% by wt.
Coating the cardboard base material 14 or the substrate 12 with the composition (40-200 μm wet film layer thickness)
Application method: doctor blade, airbrush, nozzle
Speed of the substrate 12: up to 1000 m/min
Drying: IR & convection until achieving 5-7% of residual humidity in the base material 14

6.4 Example 4

Base material 14: Cardboard with an area-related mass between 200-800 g/m², preferably uncoated
Composition (physically cross-linking):
Aqueous polyvinyl alcohol solution (Elvanol 90-50 or Elvanol 85-82, Dupont or mixtures thereof), filled with aluminosilicates and carboxymethylcellulose
Solid content: 12% by wt.
Coating the cardboard base material 14 with the composition (40-200 μm wet film layer thickness)
Application method: nozzle, single-layer application
Speed of the base material: up to 1000 m/min
Drying: IR & convection until achieving 5-7% of residual humidity in the cardboard 6.5 Example 5

Substrate 12: Cardboard with an area-related mass between 200-800 g/m², coated or preferably uncoated
Aqueous composition (thermally cross-linking or curing):
Aqueous PVOH solution, solid content 10% by wt. (Elvanol 85-82 or Elvanol 90-50 and mixtures thereof, Dupont), 100 parts
Maleic acid, p. a. (Sigma), 5 parts related to 100 parts of PVOH
Coating the substrate with the aqueous composition (1-layer application, 40-200 μm wet film layer thickness)
Application method: nozzle, single-layer application
Speed of the substrate 12: up to 1000 m/min
Drying: IR & convection until achieving 5-7% of residual humidity in the base material 14

6.6 Example 6

Base material 14: Cardboard with an area-related mass between 200-800 g/m², coated or preferably uncoated
Aqueous composition (UV curing):
Aqueous PVOH solution, solid content 10% by wt. (Elvanol 85-82 or Elvanol 90-50 and mixtures thereof, Dupont), 100 parts
Aqueous $FeCl_3$ solution (Donau Chemie), solid content 46.33% by wt., 6.7 parts related to 100 parts of PVOH
Coating the substrate with the aqueous composition (1-layer application, 40-200 μm wet film layer thickness)
Application method: nozzle, single-layer application
Speed of the base material: up to 1000 m/min
UV curing with Hg vapor high-pressure lamp, 10 s exposure, 0.4 W/cm² power 6.7 Example 7

Base material 14: Cardboard with an area-related mass between 200-800 g/m², coated or preferably uncoate
Aqueous composition (thermally curing):
Aqueous PVOH solution, solid content 10% by wt. (PVOH-8582 or Elvanol 9050 and mixtures thereof, Dupont), 100 parts Glyoxal (40% aqueous solution, BASF), 12.6 parts related to 100 parts of PVOH Coating the substrate with the aqueous composition (1-layer application, 40-200 μm wet film layer thickness)

Application method: nozzle, single-layer application

Speed of the base material: up to 1000 m/min

Drying: IR & convection until achieving 5-7% of residual humidity in the cardboard base material 14.

6.8 Example 8

Base material 14: paper with an area-related mass between 50-150 g/m$^2$, coated or preferably uncoated Aqueous composition (thermally curing):

Aqueous PVOH solution, solid content 10% by wt. (PVOH-8582 or Elvanol 9050 or mixtures thereof, Dupont), 100 parts Polyacrylic acid, 0.01-5.0 parts related to 100 parts of PVOH Coating the substrate with the aqueous composition (1-layer application, 40-200 μm wet film layer thickness)

Application method: nozzle, single-layer application

Speed of the base material: up to 1000 m/min

Drying: IR & convection until achieving 5-7% of residual humidity in the base material 14.

6.9 Example 9

Base material 14: cardboard with an area-related mass between 200-800 g/m$^2$, coated or preferably uncoated Compositions: combination of example 1 and example 2, example 1 and example 3, example 1 and example 4, example 1 and example 5, example 1 and example 6, example 1 and example 7 or example 1 and Example 8

The coating of example 1 is applied to the base material as the bottommost layer, the coating according to the recipe of example 2, 3, 4, 5, 6, 7 or 8 and/or double or triple combinations of these examples is applied thereon.

Multi-layer application, each 80-200 μm wet film layer thickness

Speed of the base material: up to 1000 m/min

Application method: doctor blade, nozzle

6.10 Example 10

Base material: Cardboard with an area-related mass between 200-800 g/m$^2$, coated or preferably uncoated Compositions:

Combination of 2 coats (aqueous compositions) of example 1 and one coat of example 2 to example 8. The coat of example 1 is used as a conditioning and covering coat in this application, to act leveling on the inner side 18 of the substrate 12 and protecting with respect to tension and compression on the outer side 16 of the substrate 12 (forces occurring in corrugating and punching operations). The covering coat is easily printable and adhesive.

Multi-layer application, each 80-200 μm wet film layer thickness

Application method: doctor blade, nozzle

Speed of the base material: up to 1000 m/min

Drying: IR & convection until achieving 5-7% of residual humidity in the cardboard.

6.11 Example 11

Base material: cardboard with an area-related mass between 200-800 g/m$^2$, coated or preferably uncoated Compositions:

Aqueous PVOH solution (Elvanol 9050 or Elvanol 8582, Selvol 103 or 107, Mowiol 15-99 or 9-98, Exceval Aq 4104 or mixtures thereof).

Wet film thickness: 20-200 μm.

Solid contents PVOH solutions: maximum 30% by wt.

Total solid contents filled PVOH solutions including cross-linker: 35-45% by wt.

Drying until achieving a residual humidity between 7 and 9% by wt. in the base material 14.

6.12 Example 12

Aqueous composition: PVOH content maximum 30% by wt. filled with pigments, addition of a colloidal polyacrylate dispersion as an additive Total solid content of the aqueous composition: max. 45% by wt.

Further processing as in the preceding embodiments.

6.13 Example 13

Aqueous composition: PVOH content maximum 30% by wt., filled with pigments, addition of microcrystalline cellulose (max. 1%) and acrylate dispersion as additives; total solid content: max. 45% by wt.

Further processing as in the preceding embodiments.

6.14 Example 14

Combination of two different aqueous compositions (coats) of the preceding embodiments for producing two different barrier layers 22a, 22b.

Further processing as in the preceding embodiments.

6.15 Example 15

Base material 14: Cardboard with an area-related mass between 200-800 g/m$^2$, preferably uncoated Composition (not cross-linking) for coating:

Aqueous polyvinyl alcohol solution (Selvol 103 or Selvol 107, Sekisui, Exceval, Kuraray or mixtures thereof)

Solid content PVOH (=total solid content): 30.00% by wt.

Coating the cardboard base material 14 with the composition (10-200 μm wet film layer thickness)

Application method: doctor blade, nozzle at 30 to 80° C.

Speed of the substrate 12: up to 1000 m/min

Drying: IR & convection until achieving 7-10% of residual humidity in the base material 14.

The substrate 12 thus produced can be used as a starting material for the application of one or more barrier layers 22.

6.16 Example 16

Base material 14: Cardboard with an area-related mass between 200-800 g/m$^2$, preferably uncoated Aqueous composition (cross-linking):

Aqueous polyvinyl alcohol solution (Selvol 103 or Selvol 107, Sekisui, Exceval, Kuraray or mixtures thereof), pigments The above listed cross-linkers or mixtures thereof are considered as cross-linkers Total solid content: up to 45.00% by wt.

Coating the cardboard base material 14 with the aqueous composition (10-200 μm wet film layer thickness)
Application method: doctor blade, nozzle at 30 to 80° C.
Speed of the substrate 12: up to 1000 m/min
Drying: IR & convection until reaching 7-10% of residual humidity in the base material 14

6.17 Example 17

Base material 14: Cardboard with an area-related mass between 200-800 g/m², preferably uncoated
Aqueous composition, cross-linking, without filler:
Aqueous polyvinyl alcohol solution (Selvol 103 or Selvol 107, Sekisui, Exceval, Kuraray or mixtures thereof)
The above listed cross-linkers or mixtures thereof are considered as cross-linkers
Total solid content: up to 30.00% by wt.
Coating the cardboard base material 14 with the aqueous composition (10-200 μm wet film layer thickness)
Application method: doctor blade, nozzle at 30 to 80° C.
Speed of the substrate 12: up to 1000 m/min
Drying: IR & convection until reaching 7-10% of residual humidity in the base material 14

6.18 Example 18

Base material 14: cardboard with an area-related mass between 200-800 g/m², preferably uncoated
Aqueous composition (physically cross-linking):
Aqueous polyvinyl alcohol solution (Selvol 103 or Selvol 107, Sekisui, Exceval, Kuraray or mixtures thereof), colloidal poly(meth)acrylate dispersion and carboxymethylcellulose
Total solid content: 25-45% by wt.
Coating the cardboard base material 14 with the composition (10-200 μm wet film layer thickness)
Application method: nozzle, single-layer application at 30 to 80° C.
Speed of the base material: up to 1000 m/min
Drying: IR & convection until achieving 7-10% of residual humidity in the cardboard

6.19 Example 19

Substrate 12 or base material 14: cardboard with an area-related mass between 200-800 g/m², coated or preferably uncoated
Aqueous composition (thermally cross-linking or curing):
Aqueous PVOH solution, solid content 10-20% by wt. (Selvol 103 or Selvol 107, Sekisui, Exceval, Kuraray or mixtures thereof), 100 parts
Pigments, 60 parts related to 100 parts of PVOH
Maleic acid (DSM) as cross-linker, 5 parts related to 100 parts of PVOH
Total solid content: 17-35% by wt.
Coating the substrate 12 with the aqueous composition (1-layer application, 10-200 μm wet film layer thickness)
Application method: nozzle, single-layer application at 30 to 80° C.
Speed of the substrate 12: up to 1000 m/min
Drying: IR & convection until achieving 7-10% of residual humidity in the base material 14

6.20 Example 20

Substrate 12 or base material 14: cardboard with an area-related mass between 200-800 g/m², coated or preferably uncoated
Aqueous composition (thermally cross-linking):
Aqueous PVOH solution, solid content 10-22% by wt. (Selvol 103 or Selvol 107, Sekisui, Exceval, Kuraray or mixtures thereof), 100 parts
Pigments, 20-50 parts related to 100 parts of PVOH
Maleic acid as cross-linker, 5-10 parts related to 100 parts of PVOH
Total solid content: 18-35% by wt.
Coating the substrate with the aqueous composition (1-layer application, 10-200 μm wet film layer thickness)
Application method: nozzle, single-layer application at 30 to 80° C.
Speed of the substrate 12: up to 1000 m/min
Drying: IR & convection until achieving 7-10% of residual humidity in the base material 14

6.21 Example 21

Base material 14: cardboard with an area-related mass between 200-800 g/m², preferably uncoated
Composition (physically cross-linking):
Aqueous polyvinyl alcohol solution (Selvol 103 or Selvol 107, Sekisui, Exceval, Kuraray or mixtures thereof), 100 parts
Colloidal polymer dispersion, 20-40 parts related to 100 parts of PVOH
Pigments, 20-50 parts related to 100 parts of PVOH
Cross-linker or mixtures thereof, 5-10 parts related to 100 parts of PVOH
Total solid content: 25-45% by wt.

6.22 Example 22

Application of one of the above embodiments with double slit.
By the division of the aqueous composition into the two chambers and the subsequent combination in a container, excess aqueous composition is collected in varietal manner.

6.23 Further Examples

Based on the above mentioned recipes, further variations and combinations are possible:
Alternative cross-linkers:
6.7% $FeCl_3$ related to 100% of PVOH (or PVOH copolymer)
12.6% glyoxal related to 100% of PVOH (or PVOH copolymer)
0.01 to 5% poly(meth)acrylic acid (dispersion) related to 100% of PVOH
Application of single- and multi-layer coatings by means of doctor blade or nozzle, wherein the compositions of the examples 12, 13 and 17 can be used as a conditioning layer.
Colloidal Dispersions/Suspensions
Colloids are macroscopic particles distributed in a homogeneous dispersion medium with a size of 1-1000 nm. Colloidal dispersions appear colorless if the degree of fragmentation of the colloids is at 500 nm. Among other things, the stability of colloids is depending on the factors of pH value, dispersant, additives (surface active agents), propensity for micelle formation etc. One speaks of colloidal particles e.g. in aqueous system if the molecular weight is (Mr)>1000 g/mol. If the particles have Mr<1000 g/mol, thus, one often speaks of molecular solutions. Dispersions are composed of macromolecular molecules, which can be partially or completely cross-linked and which no longer dissolve due to their molecular weight. Examples for polymer, polar dispersions are:

poly(meth)acrylates,
polymethylmethacrylates
polyethyleneglycolacrylates
polyamides
polyesters (for example acrylic acid esters, vinyl esters, biopolymers like polylactic acid ester, PHA, polyhydroxybutyrate, PHB)
polyurethanes
styrene-butadiene copolymers
carbohydrate colloids such as cellulose, starch, dextrin, chitosan
proteins
polyvinylacrylate dispersions or copolymer dispersions thereof.

Furthermore, there are still organic-inorganic hybrid polymer dispersions, which are present in colloidal manner. Examples for them are tetraorthosilicates (TEOS), which are modified with functional organic groups by means of sol-gel reaction. All of the inorganic pigments, fillers, additives, catalysts, which have particle sizes of few nm to several µm and can be dispersed in a liquid, solid or gaseous phase (applies to all of the colloids), come within the group of the inorganic colloids.

The parameter values specified in the documents for defining process and measurement conditions for the characterization of specific properties of the inventive subject matter are to be considered as encompassed by the scope of the invention even within the scope of deviations—for example due to measurement errors, system errors, weighing errors, DIN tolerances and the like.

It would be appreciated by those skilled in the art that various changes and modifications can be made to the illustrated embodiments without departing from the spirit of the present invention. All such modifications and changes are intended to be covered by the appended claims.

What is claimed is:

1. A packaging material, comprising:
a substrate having a base material of pulp, an outer side to be faced away from a packaging item as well as an inner side to be faced towards the packaging item, wherein the base material is coated or uncoated paper, coated or uncoated cardboard, or coated or uncoated paperboard; and
a plurality of layers disposed on the inner side of the substrate with at least two barrier layers for hydrophobic compounds, wherein at least a first barrier layer is produced by coating at least the inner side of the substrate with at least one layer of an aqueous composition including at least polyvinyl alcohol and/or at least one polyvinyl alcohol copolymer as well as a cross-linking agent, wherein the aqueous composition has before drying at most 40% by wt. of polyvinyl alcohol and/or polyvinyl alcohol copolymer and a total solid content of at most 55% by wt., and by drying the at least two barrier layers and cross-linking the polyvinyl alcohol and/or the polyvinyl alcohol copolymer with the aid of the cross-linking agent with formation of said at least two barrier layers for hydrophobic compounds, and wherein the plurality of layers additionally include
at least one additional layer, which contains one or more of a non-cross-linked polyvinyl alcohol and a non-cross-linked polyvinyl alcohol copolymer, wherein said at least one additional layer, which contains non-cross-linked polyvinyl alcohol and/or a non-cross-linked polyvinyl alcohol copolymer, is disposed on a side of a second barrier layer facing away from the base material; and
wherein said second barrier layer of said at least two barrier layers is formed from one or more of said cross-linked polyvinyl alcohol and said cross-linked polyvinyl alcohol copolymer.

2. The packaging material according to claim 1, wherein at least one of the at least two barrier layers after drying is at least predominantly composed of cross-linked polyvinyl alcohol and/or cross-linked polyvinyl alcohol copolymer.

3. The packaging material according to claim 1, wherein the at least two barrier layers include cross-linked polyvinyl alcohol and/or cross-linked polyvinyl alcohol copolymer, wherein at least one barrier layer includes at least one filler and/or at least one pigment.

4. The packaging material according to claim 1, wherein the plurality of layers further includes at least one layer, which contains non-cross-linked polyvinyl alcohol and/or a non-cross-linked polyvinyl alcohol copolymer, wherein the layer containing the non-cross-linked polyvinyl alcohol and/or the non-cross-linked polyvinyl alcohol copolymer is disposed between two of the at least two barrier layers.

5. The packaging material according to claim 1, wherein the cross-linking agent, configured and arranged to cross-link the polyvinyl alcohol and/or the polyvinyl alcohol copolymer, provides a three-dimensional network by reaction with the polyvinyl alcohol and/or said polyvinyl alcohol copolymer.

6. The packaging material according to claim 5, wherein the cross-linking agent comprises at least one alkyl orthosilicate and/or at least one bi-, tri-, or multi-functional compound which contributes to the formation of a three-dimensional network by reaction with the hydroxyl groups of the polyvinyl alcohol and/or the polyvinyl alcohol copolymer and which comprises at least two functional groups selected from carboxylic acid and carboxylic acid anhydride.

7. The packaging material according to claim 6, wherein the cross-linking agent is one or more of tetraethylorthosilicate, malonic acid, glutaric acid, adipic acid, citric acid, butanetetracarboxylic acid and maleic acid.

8. The packaging material according to claim 1, wherein the aqueous composition has a pH value adjusted to a value between 1 and 6.5 before application to the substrate.

9. The packaging material according to claim 1, wherein the coated substrate has a residual humidity between 3% by wt. and 12% by wt.

10. The packaging material according to claim 1, the outer side of the substrate includes a conditioning layer and/or a cover layer thereon.

11. The packaging material according to claim 1, wherein said at least two barrier layers include one or more of
polyvinyl alcohols and/or polyvinyl alcohol copolymers with different degrees of polymerization and/or
polyvinyl alcohols and/or polyvinyl alcohol copolymers with different degrees of hydrolysis and/or
polyvinyl alcohols and/or polyvinyl alcohol copolymers cross-linked by different cross-linking agents.

* * * * *